Dec. 9, 1930.  H. WALLACE  1,784,323

GRIT DISTRIBUTING DEVICE

Filed June 6, 1930

INVENTOR.
H. WALLACE.
By Blair & Kilcoyne
ATTYS.

Patented Dec. 9, 1930

1,784,323

UNITED STATES PATENT OFFICE

HENRY WALLACE, OF LONDON, ENGLAND

GRIT-DISTRIBUTING DEVICE

Application filed June 6, 1930, Serial No. 459,495, and in Great Britain August 19, 1929.

This invention relates to a device for distributing grit or the like in front of the road wheels of vehicles to overcome the tendency of the wheels to slip on wet or greasy surfaces, when, for example, the brakes are suddenly applied. The invention has for its object to provide an improved construction of such device which will be reliable in operation, compact and capable of being readily mounted on or detached from the vehicle.

According to this invention the device comprises a container adapted to be mounted on the vehicle adjacent to one of the road wheels and having a partition which is inclined towards the wheel, so that an upper compartment for grit is provided separate from a lower compartment which contains means for actuating a shutter or the like to control an outlet port for the grit.

Preferably the shutter and its actuating means are carried on the lower surface of the partition so that they are normally totally enclosed but capable of being assembled on the partition and detached or inserted as a unit therewith.

Figure 1:
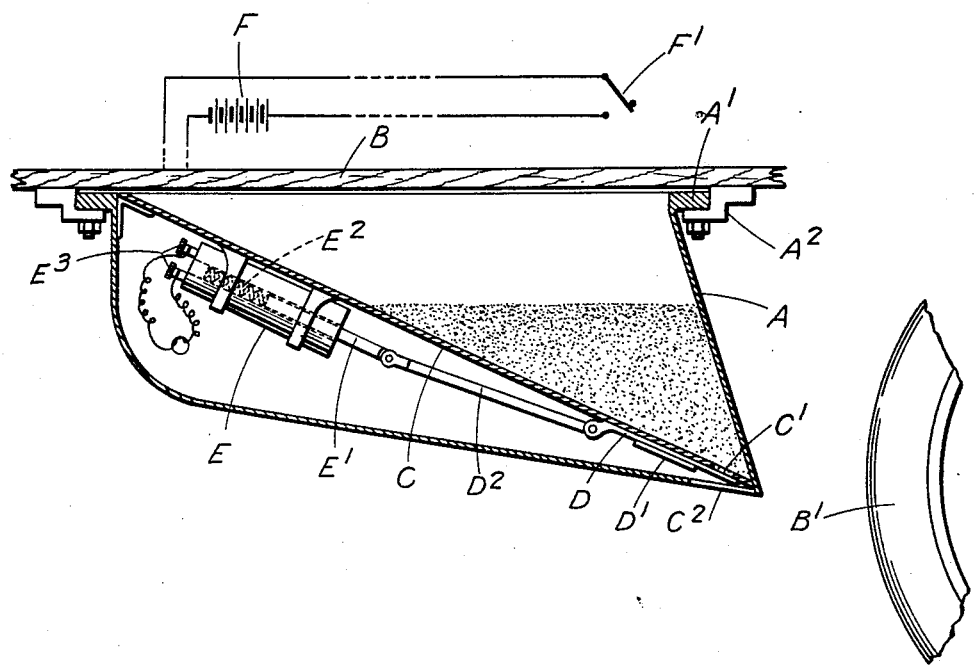
Figure 2:
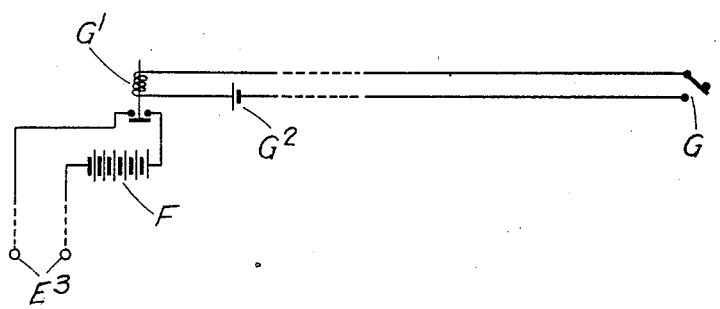

One construction of a device according to the present invention is illustrated somewhat diagrammatically and by way of example in the accompanying drawings in which Figure 1 is a sectional side elevation with an operating circuit diagram, and Figure 2 illustrates a modified arrangement of the operating circuit shown in Figure 1.

In the construction illustrated the device comprises a container A having transverse flanges $A^1$ adapted to slide in guides $A^2$ secured beneath the running board B of the vehicle immediately in front of one of the road wheels, indicated at $B^1$.

The container A has a removable partition C which, when in position inclines towards the wheel $B^1$ and divides the container into an upper grit containing compartment and a lower compartment for the operating mechanism. Provided in the lower end of the partition C is a transverse outlet port $C^1$ which normally registers with an opening $C^2$ in the base of the container. The port $C^1$ can be controlled by mechanism carried on the lower face of the partition comprising a shutter D mounted to slide in guides $D^1$ and connected by a rod $D^2$ to the core $E^1$ of a solenoid E. A control spring $E^2$ in the solenoid tends to maintain the core $E^1$ in the outward position. A power circuit connected to the terminals $E^3$ of the solenoid includes a battery F, which may be the lighting battery of the vehicle, and a control switch $F^1$ arranged near the driver's seat.

When it is desired to release grit from the container the control switch $F^1$ is closed, and the solenoid E being thus energized from the battery F, the core $E^1$ draws the shutter D clear of the outlet port $C^1$ thus compressing the spring $E^2$ and allowing grit to escape through the opening $C^2$. When the control switch $F^1$ is opened and the solenoid thereby deenergized the spring $E^2$ pushes the core outwards so that the shutter returns to its normal position in which it closes the outlet port $C^1$.

In cases where a relatively long operating circuit is necessary, the voltage drop may be reduced by providing instead of the switch $F^1$ a relay $G^1$ (Figure 2) disposed adjacent to the battery F and capable of being energized from a subsidiary battery $G^2$ when a control switch G near the driver's seat is closed. Further, instead of the control spring $E^2$ being disposed within the solenoid it may be arranged to act, for example, between the shutter or the rod $D^2$ and a relatively fixed part of the device.

It will be understood that while it is preferred to operate the device by electric means, the shutter or its equivalent within the lower compartment may, for example, be actuated by means of a flexible power transmission device or by lever and link mechanism.

A device constructed in accordance with the invention while providing a compact unit which can be readily attached or removed from the vehicle has the additional advantages that the operating mechanism for the shutter is protected from grit carried in the container itself and is also readily removable with the partition when it is desired to examine or repair the moving parts.

What I claim as my invention and desire to secure by Letters Patent is:—

1. A device for distributing grit before the road wheels of vehicles including in combination a container adapted to be mounted in front of and adjacent to one of the wheels, a removable partition in the container inclined toward the wheel so as to divide the container into an upper grit compartment and a lower compartment, an outlet port for grit in the lower end of the partition registering with an opening in the base of the container, and means for controlling the outlet port carried on the lower face of the partition and comprising a shutter and a solenoid operatively connected thereto.

2. A device for distributing grit before the road wheels of vehicles including in combination a container adapted to be mounted in front of and adjacent to one of the wheels, a partition in the container inclined toward the wheel so as to divide the container into an upper grit compartment and a lower compartment, an outlet port for grit in the lower end of the partition registering with an opening in the base of the container, and means for controlling the outlet port carried on the lower face of the partition so as to form a removable unit therewith.

3. A device for distributing grit before the road wheels of vehicles including in combination a container adapted to be mounted in front of and adjacent to one of the wheels, a partition in the container inclined toward the wheel so as to divide the container into an upper grit containing compartment and a lower compartment, an outlet port for grit in the lower end of the upper compartment, means disposed in the lower compartment for controlling the outlet port comprising a shutter and a solenoid operatively connected thereto, an electric circuit connected to the solenoid and including a relay and a switch remote from the container which when closed energizes the relay to close the circuit and thereby energizes the solenoid.

4. A device for distributing grit before the road wheels of vehicles including in combination a container adapted to be mounted in front of and adjacent to one of the wheels, a partition in the container inclined toward the wheel so as to divide the container into an upper grit compartment and a lower compartment, an outlet port for grit in the lower end of the partition registering with an opening in the base of the container, means for controlling the outlet port carried on the lower face of the partition so as to form a detachable unit therewith including a shutter and a solenoid operatively connected thereto, and an electric circuit connected to the solenoid including a relay and a switch remote from the container which when closed operates the relay and thereby energizes the solenoid.

In testimony whereof I have signed my name to this specification.

HENRY WALLACE.